United States Patent
Schantz, Jr. et al.

[11] Patent Number: 5,517,063
[45] Date of Patent: May 14, 1996

[54] THREE PHASE POWER BRIDGE ASSEMBLY

[75] Inventors: David L. Schantz, Jr., Ellicott City; James H. Deoms, Glen Arm; Brian H. Smith, Arnold, all of Md.

[73] Assignee: Westinghouse Electric Corp., Pittsburgh, Pa.

[21] Appl. No.: 258,033

[22] Filed: Jun. 10, 1994

[51] Int. Cl.$^6$ .......................... B60L 1/00; H02M 7/5387
[52] U.S. Cl. .......................... 307/9.1; 361/775; 363/71; 363/132
[58] Field of Search ..................... 307/9.1, 10.1, 307/147, 58, 45, 82; 361/775; 363/147, 144, 145, 132, 71; 174/71 B, 88 B, 70 B, 99 B, 133 B; 318/139, 801; 439/115, 116, 119, 707, 210, 212–214

[56] References Cited

U.S. PATENT DOCUMENTS

| | | | |
|---|---|---|---|
| 4,142,224 | 2/1979 | Wilson et al. | 174/133 B |
| 5,055,990 | 10/1991 | Miki et al. | 363/132 |
| 5,172,310 | 12/1992 | Deam et al. | 363/132 |
| 5,254,501 | 10/1993 | Tung et al. | 437/214 |
| 5,291,388 | 3/1994 | Heinrich | 363/132 |
| 5,313,363 | 5/1994 | Arbanas | 361/775 |
| 5,388,028 | 2/1995 | Arbanas | 361/775 |

*Primary Examiner*—William M. Shoop, Jr.
*Assistant Examiner*—Richard T. Elms
*Attorney, Agent, or Firm*—Philip Florenzo

[57] ABSTRACT

A power bridge assembly for providing electric current to stator windings of an electric motor used in an electric propulsion system for an electric vehicle. The power bridge is assembled on a laminated bus bar. An upper plate of the bus bar connects to one side of a high voltage battery, a lower plate of the bus bar connects to the other side of the high voltage battery, and an insulation layer is sandwiched between the upper and lower plates. Electrical switches and capacitors sandwich the laminated bus bar. With this structure, two fasteners, one for positive voltage and one for negative voltage, can connect the bus bar, capacitors, and switches both electrically and mechanically. The sandwich structure eliminates parasitic inductance from the electrical connections.

17 Claims, 7 Drawing Sheets

THREE PHASE POWER BRIDGE ASSEMBLY

RELATED APPLICATIONS

The following identified U.S. patent applications are filed on the same date as the instant application and are relied upon and incorporated by reference in this application.

U.S. patent application entitled "Flat Topping Concept" bearing application Ser. No. 08/258,295 and filed on Jun. 10, 1994, now U.S. Pat. No. 5,475,581;

U.S. patent application entitled "Electric Induction Motor And Related Method Of Cooling" bearing application Ser. No. 08/258,150 and filed on Jun. 10, 1994, now abandoned;

U.S. patent application entitled "Automotive 12 Volt System For Electric Vehicles" bearing application Ser. No. 08/258,142 and filed on Jun. 10, 1994, now pending;

U.S. patent application entitled "Direct Cooled Switching Module For Electric Vehicle Propulsion System" bearing application Ser. No. 08/258,027 and filed on Jun. 10, 1994, now pending;

U.S. patent application entitled "Electric Vehicle Propulsion System" bearing application Ser. No. 08/258,301 and filed on Jun. 10, 1994, now pending;

U.S. patent application entitled "Speed Control and Bootstrap Technique For High Voltage Motor Control" bearing application Ser. No. 08/258,294 and filed on Jun. 10, 1994, now pending;

U.S. patent application entitled "Vector Control Board For An Electric Vehicle Propulsion System Motor Controller" bearing application Ser. No. 08/258,306 and filed on Jun. 10, 1994, now pending;

U.S. patent application entitled "Digital Pulse Width Modulator With Integrated Test And Control" bearing application Ser. No. 08/258,305 and filed on Jun. 10, 1994, now pending;

U.S. patent application entitled "Control Mechanism For Electric Vehicle" bearing application Ser. No. 08/258,149 and filed on Jun. 10, 1994, now U.S. Pat. No. 5,463,294;

U.S. patent application entitled "Improved EMI Filter Topology for Power Inverters" bearing application Ser. No. 08/258,153 and filed on Jun. 10, 1994, pending;

U.S. patent application entitled "Fault Detection Circuit For Sensing Leakage Currents Between Power Source And Chassis" bearing application Ser. No. 08/258,179 and filed on Jun. 10, 1994, now U.S. Pat. No. 5,481,194;

U.S. patent application entitled "Electric Vehicle Relay Assembly" bearing application Ser. No. 08/258,117 and filed on Jun. 10, 1994, now pending;

U.S. patent application entitled "Electric Vehicle Propulsion System Power Bridge With Built-In Test" bearing application Ser. No. 08/258,034 and filed on Jun. 10, 1994, now pending;

U.S. patent application entitled "Method For Testing A Power Bridge For An Electric Vehicle Propulsion System" bearing application Ser. No. 08/258,178 and filed on Jun. 10, 1994, now pending;

U.S. patent application entitled "Electric Vehicle Power Distribution Module" bearing application Ser. No. 08/258,157 and filed on Jun. 10, 1994, now pending;

U.S. patent application entitled "Electric Vehicle Chassis Controller" bearing application Ser. No. 08/258,628 and filed on Jun. 10, 1994, now pending;

U.S. patent application entitled "Electric Vehicle System Control Unit Housing" bearing application Ser. No. 08/258,156 and filed on Jun. 10, 1994, now pending;

U.S. patent application entitled "Low Cost Fluid Cooled Housing For Electric Vehicle System Control Unit" bearing application Ser. No. 08/258,299 and filed on Jun. 10, 1994, now pending;

U.S. patent application entitled "Electric Vehicle Coolant Pump Assembly" bearing application Ser. No. 08/258,296 and filed on Jun. 10, 1994, pending;

U.S. patent application entitled "Heat Dissipating Transformer Coil" bearing application Ser. No. 08/258,141 and filed on Jun. 10, 1994, now U.S. Pat. No. 5,469,124;

U.S. patent application entitled "Electric Vehicle Battery Charger" bearing application Ser. No. 08/258,154 and filed on Jun. 10, 1994, now pending.

BACKGROUND OF THE INVENTION

1. Field of the Invention

The present invention relates to an electric propulsion system for use in electric vehicles. More particularly, the present invention relates to a three-phase power bridge assembly used to drive an electric motor in an electric vehicle propulsion system.

2. Description of the Related Art

Alternating current (AC) electric motors typically contain stator windings and a rotor. AC current is applied to the stator and produces a magnetic field which interacts with the rotor to produce a torque. When a direct current (DC) is used to drive an AC motor, the direct current must first be converted to AC current which is transmitted to the motor.

High voltage AC electric motors, such as those used in electric propulsion systems for an electric vehicle, may employ an inverter circuit including specially designed power switches connected in a bridge configuration to produce AC current to drive the stator windings. Semiconductor switches are desirably used in power bridges of inverter circuit because of their high speed, easy electric control, and reliability. However, most common semiconductor switches cannot withstand high voltages.

Bipolar transistors are, in some ways, attractive candidates for use in power bridges because of their ability to withstand high voltages. High voltage bipolar transistors, however, also require high driving currents, a feature which is undesirable because ordinary metal on silicon field effect transistors (MOSFETs) cannot be used to drive these high voltage bipolar transistors. Therefore, field effect transistors (FETs), which can be driven by MOSFET inputs have been used in power bridges. Unfortunately, single FETs for high voltage operations are extremely expensive, and several hundred lower voltage FETs must be used together in a power bridge. This increases complication, expense, and manufacturing time.

Another problem encountered in power bridges for electric vehicle propulsion system inverter circuits is that rapidly switching a high voltage can create undesirable electromagnetic interference (EMI) which interferes with surrounding electrical components. EMI can be reduced by known filter circuitry using inductors and capacitors. However, interactions of filter capacitors and stray inductances formed in circuit interconnectors can interact to generate undesirable parasitic oscillation currents. For example, electrically conducting brackets commonly used to connect inverter switches, filter capacitors, and a DC input power bus bar can form inductances which give rise to undesirable voltage spikes or parasitic oscillation current. In a high voltage system such as an electric propulsion system for an electric vehicle, such parasitic oscillation currents can interfere with other components of the system.

The mounting brackets are typically soldered to the output terminals of a filter capacitor. These solder joints create an area of thermal stress which may lead to breakdowns of the power bridge. Additionally, soldered joints add manufacturing complication and expense.

SUMMARY OF THE INVENTION

Accordingly, the present invention is directed to a switching assembly for an electric vehicle propulsion system which substantially obviates one or more of the problems due to limitations and disadvantages of the related art.

To achieve these and other advantages and in accordance with the purpose of the invention, as embodied and broadly described, the invention provides for a switching assembly for an electric vehicle propulsion system. The switching assembly includes a capacitor having a first terminal and a second terminal; an electronic switch having a first terminal and a second terminal; a laminated bus bar having first and second overlapping sections; and means for connecting the first terminal of the capacitor, the first terminal of the switch, and the first section of the bus bar together and for connecting the second terminal of the capacitor, the second terminal of the switch, and the second section of the bus bar together.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate a presently preferred embodiment of the invention and, together with the description, serve to explain the principles of the invention. In the drawings.

DESCRIPTION OF THE PREFERRED EMBODIMENT

Reference will now be made in detail to a present preferred embodiment of the invention, an example of which is illustrated in the accompanying drawings.

Figure 1:
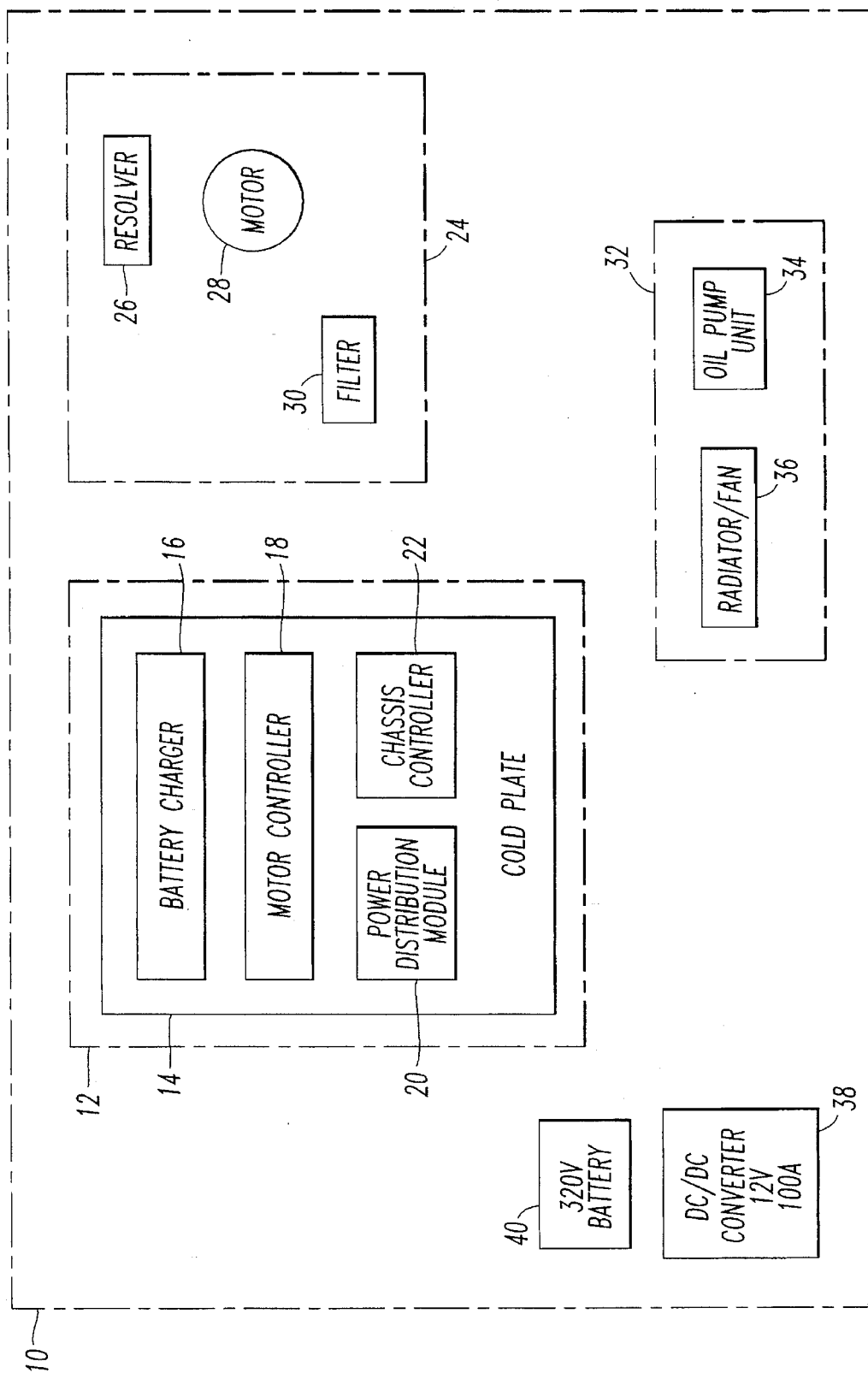
FIG. 1 is a block diagram of an electric vehicle propulsion system.

As shown in FIG. 1, there is provided an electric vehicle propulsion system 10 comprising a system control unit 12, a motor assembly 24, a cooling system 32, a battery 40, and a DC to DC converter 38. The system control unit 12 includes a cold plate 14, a battery charger 16, a motor controller 18, a power distribution module 20, and a chassis controller 22. The motor assembly 24 includes a resolver 26, an AC electric motor 28, and a filter 30. The cooling system 32 includes an oil pump unit 34 and a radiator fan 36.

Figure 2:
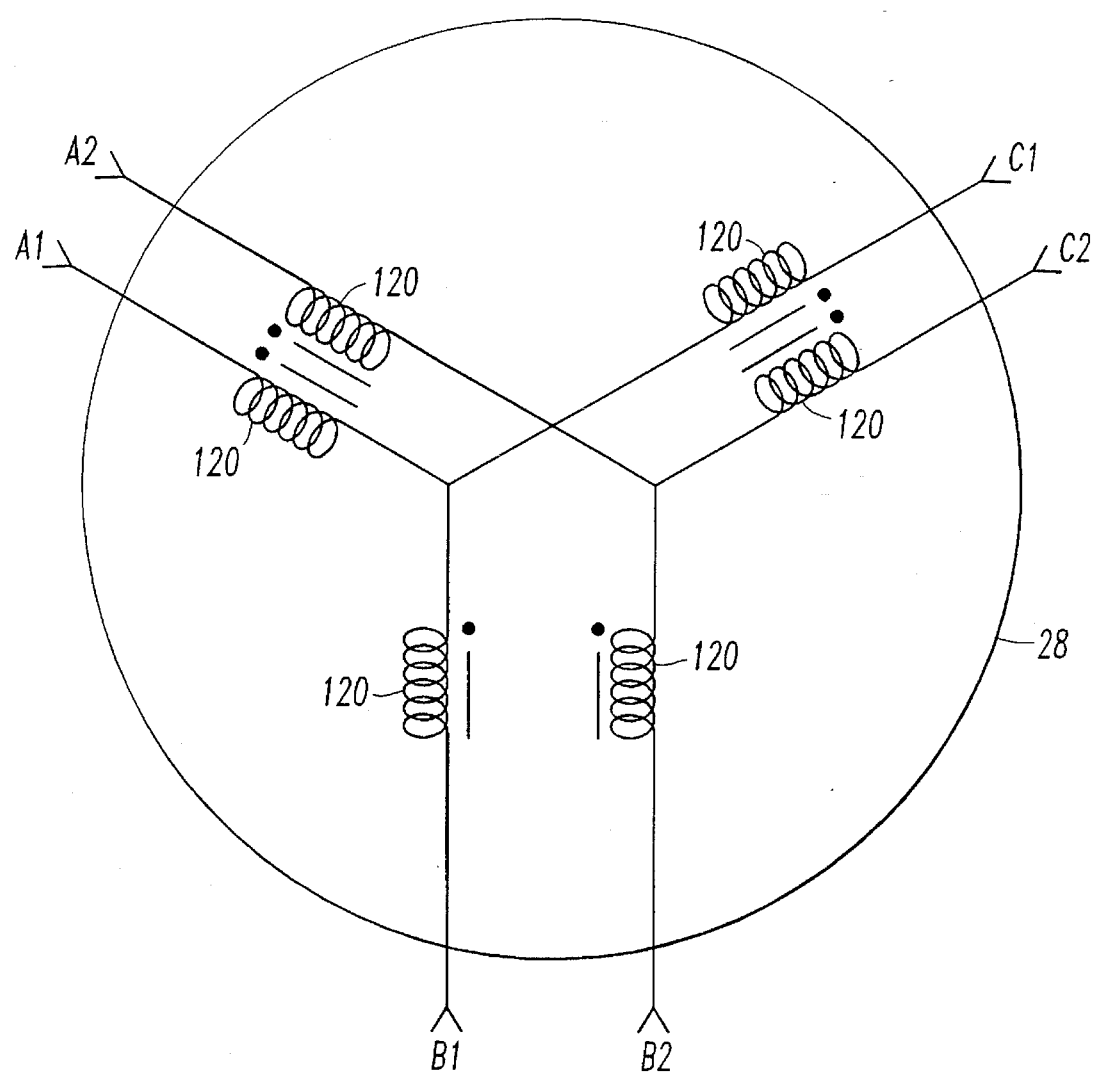
FIG. 2 is a schematic diagram of an electric motor for an electric vehicle propulsion system.

FIG. 2 shows a schematic diagram of the electric motor 28 shown in FIG. 1. The electric motor 28 is a dual-winding, three phase motor, and includes stator windings 120 which are supplied with AC electric current. The resulting magnetic field created when a current runs through the stator windings 120 interacts with a rotor (not shown) to produce torque. A typical single-winding, three-phase electric motor has three stator windings 120, while the dual phase motor 28 has six stator windings 120.

The motor controller 18 receives high voltage direct current from the battery 40, converts the direct current into three-phase alternating current, and sends the alternating current to the motor 28. To convert from alternating current to direct current, power bridge circuits in the motor controller 18 rapidly switch high voltage direct current from the battery 40 on and off to generate an AC waveform. Preferably, six switching circuits connected via a dual-bridge configuration provide AC current to the six stator winding terminals A1, A2, B1, B2, C1 and C2 of the motor 28. However, a single power bridge having only three switching circuits may be used for a single-winding three-phase motor having three stator windings.

Figure 3:
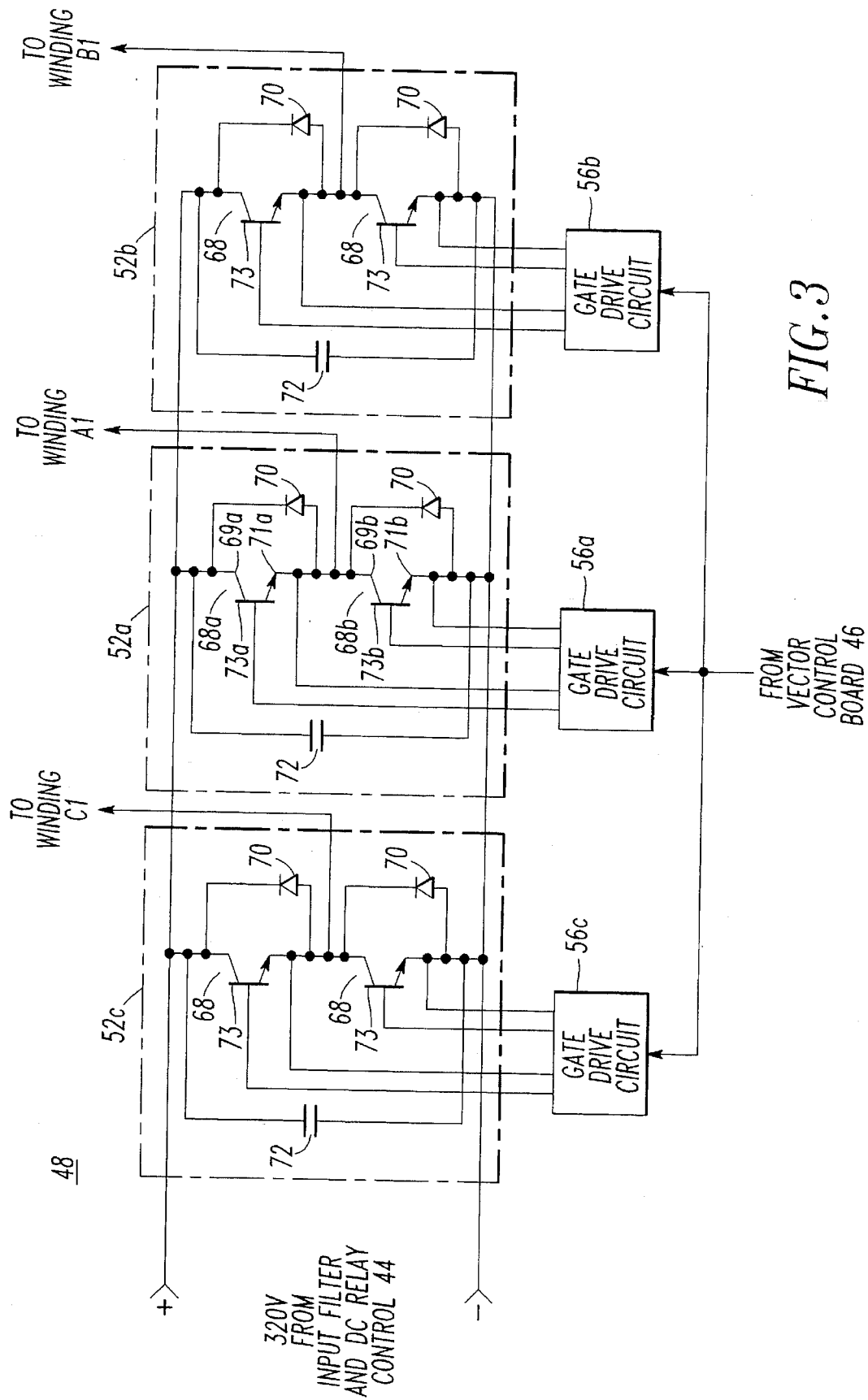
FIG. 3 is a schematic diagram of a first power bridge assembly for an electric vehicle propulsion system in accordance with the preferred embodiment of the present invention.
Figure 4:
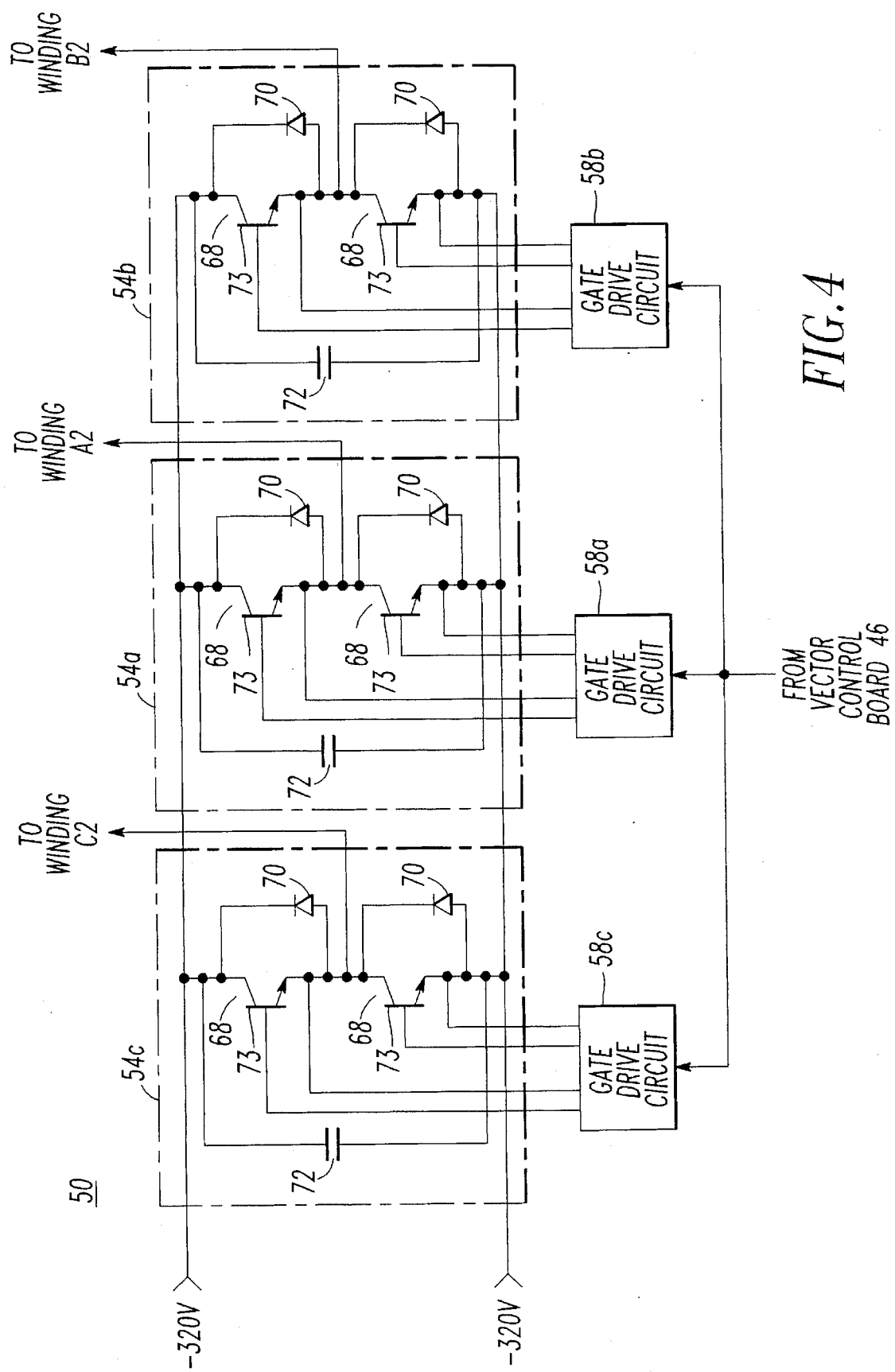
FIG. 4 is a schematic diagram of a second power bridge assembly for an electric vehicle propulsion system in accordance with the preferred embodiment of the present invention.
Figure 5:
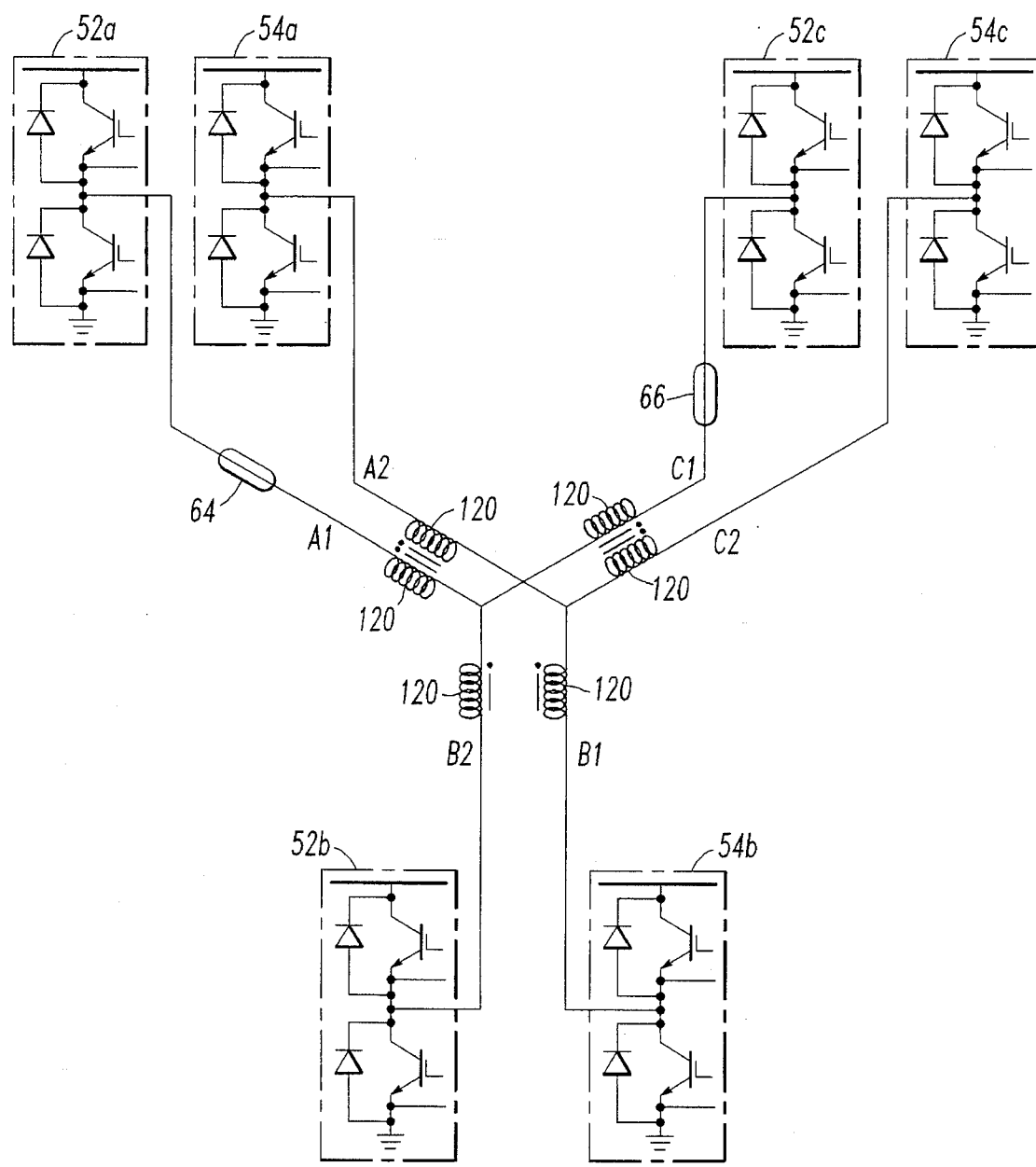
FIG. 5 is a schematic diagram of the electrical connections of the motor shown in FIG. 2 and the first and second power bridges shown in FIGS. 3 and 4.

A schematic diagram of a first power bridge 48 is shown in FIG. 3, and a schematic diagram of a second power bridge 50 is shown in FIG. 4. The first power bridge 48 and the second power bridge 50 can be assembled on the same bus bar to create a dual power bridge. A schematic diagram of the connections between a dual power bridge comprising first and second power bridges 48 and 50 and the motor 28 is shown in FIG. 5. Current sensors 64 and 66 shown in FIG. 5 sense the current on stator windings 120, and this information is used to drive the power bridge circuits.

The first and second power bridges 48 and 50 convert input direct current into output three phase alternating current. Power bridge 48 receives an input high voltage current from battery 40, preferably 340 volts, and outputs an alternating current at terminals A1, B1, and C1. Power bridge 50 also receives an input high voltage current from battery 40, preferably 340 volts, and outputs an alternating current at terminals A2, B2, and C2. As shown in FIG. 5, terminals A1, A2, B1, B2, C1, and C2 connect to stator windings 120 of motor 28.

Power bridge 48 includes three insulated gate bipolar transistor (IGBT) circuits 52a, 52b, and 52c, while power bridge 50 includes three identical IGBT circuits 54a, 54b, and 54c. Preferably, three IGBT circuits 52a, 52b, and 52c and three IGBT circuits 54a, 54b, and 54c produce a three phase alternating current at six outputs. Although different numbers of IGBT circuits could be used, six IGBT circuits are preferred. For example, three IGBT circuits could produce a three phase alternating current, but each IGBT circuit would have to switch twice as much direct current as is switched using six IGBT circuits.

In each IGBT circuit 52a–54c, two IGBT's 68 are serially connected together. A diode 70 is connected across the current path of each IGBT 68, and a capacitor 72 is connected across the combined current paths of the serially connected IGBT's 68.

Referring specifically to IGBT circuit 52a as an example, a collector 69a of IGBT 68a is connected to the positive side of battery 40, an emitter 71a of IGBT 68a is connected to the collector 69b of IGBT 68b, and an emitter 71b of IGBT 68b is connected to the negative side of battery 40. Output terminal A1 is connected to the emitter 71a of IGBT 68a and the collector 69b of IGBT 68b. Diodes 70 are connected across the current paths of IGBTs 68a and 68b.

The gates 73 of IGBTs 68 in power bridge 48 are connected to driving circuits 56a, 56b, and 56c, while the gates 73 of IGBTs 68 in power bridge 50 are connected to gate driving circuits 58a, 58b, and 58c. The gate drive circuits 56a, 56b, 56c, 58a, 58b, and 58c produce pulses which are supplied to the gates 73 of IGBT's 68 to selectively switch IGBTs 68. Thus, gate drive circuits 56a, 56b, and 56c control the timing of the switching in power bridge 48, while gate driving circuits 58a, 58b and 58c control the timing of the switching in power bridge 50.

IGBT's are preferably used as the power switches in power bridges 48 and 50 because of their high current density and comparably small size and weight. IGBT's have MOSFET drive inputs, and, therefore, present relatively easy drive requirements, can be driven from a pulse voltage source, and have low switching losses. Because their output power stages are bipolar, IGBTs have small conduction losses. Indeed, an IGBT-based inverter has a demonstrated efficiency of 97%. This minimizes heat generation from the power bridges 48 and 50.

Switching high voltage direct current at the frequencies contemplated to drive an electric motor produces undesirable electromagnetic interference (EMI). Therefore, shielding or filtering must be provided to reduce the emission of undesirable EMI from the electric vehicle. Filtering is also provided to protect battery 40 from undesirable parasitic oscillation currents.

As shown in FIG. 3, a capacitor 72 is connected between the collector 69a of IGBT 68a and the emitter of 71b of IGBT 68b. Capacitors 72 provide an AC electrical short circuit between the input direct current terminals of the power bridge circuits 48 and 50. This short current, in connection with other filter components (not shown), provides electric filtering to reduce the EMI.

A more complete description of a filter circuit including capacitors 72 is set forth in U.S. patent application entitled "Improved EMI Filter Topology For Power Inverters", bearing attorney docket no. 58,340, filed on the same day as the present application and assigned to a common assignee.

The capacitor 72 may be, for example, a film capacitor having a value of 45 microfarads. Such thin film capacitors are especially manufactured for low internal inductance and can convey high ripple current values. Capacitor 72 also stores voltage while the IGBT circuit is turned off, so that capacitor 72 acts as a storage battery when the IGBT circuit is turned on.

Figure 6:
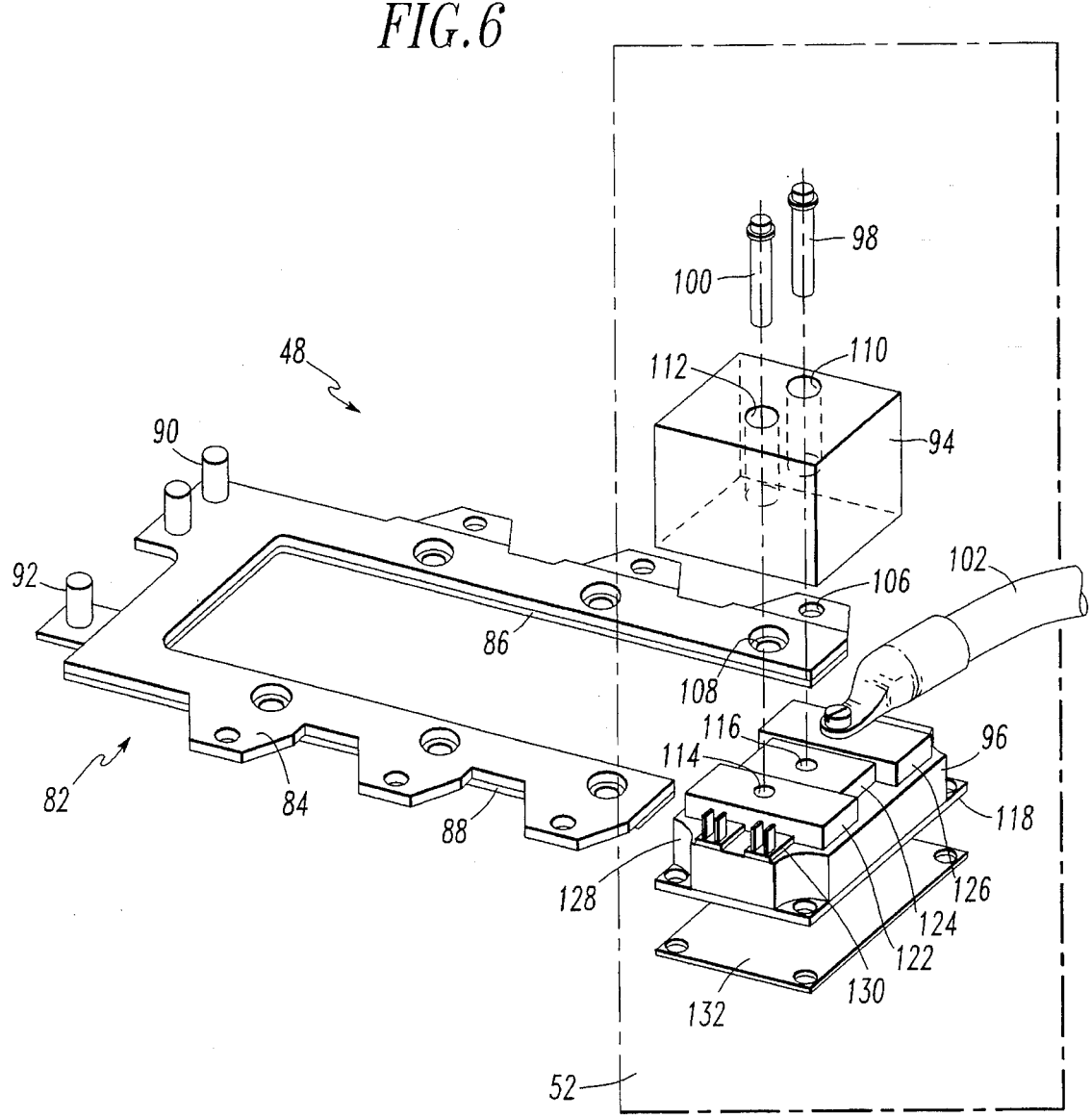
FIG. 6 is an exploded view of a portion of a dual power bridge assembly for an electric vehicle propulsion system according to the preferred embodiment of the invention.

FIG. 6 shows an exploded view of dual-bridge circuit 48 with one of six IGBT circuits 52 shown.

In one embodiment of the present invention, a power bridge is assembled on a laminated bus bar 82. An upper plate 84 of the bus bar 82 connects to one side of the battery 40, a lower plate 86 of the bus bar connects to the other side of battery 40, and an insulation layer 88 is sandwiched between the upper and lower plates. Electrical switches and capacitors sandwich the laminated bus bar 82. With this structure, two fasteners, one for positive voltage and one for negative voltage, can connect the bus bar 82, capacitors, and switches both electrically and mechanically.

As shown in FIG. 6, the bus bar 82 is sandwiched between a capacitor package 94 containing capacitor 72 and an IGBT package 96 containing IGBTs 68 and diodes 70. FIG. 6 shows a U-shaped bus bar 82 which is preferably used in the dual power bridge embodiment. Each side of the bus bar will connect three IGBT packages 96 with their associated capacitor packages 94. In an alternative single power bridge embodiment, a straight line bus bar is preferably used to connect three IGBT packages 96 with their associated capacitor packages 94.

In either the dual power bridge embodiment or the single power bridge embodiment, a film capacitor having a capacitance of 45 microfarads is preferably used. For example, a capacitor package manufactured by Electronic Concepts Inc. of Eatontown, N.J. having Part No. MP9-11049K may be used. In the dual power bridge embodiment, an IGBT package manufactured by Toshiba Part No. MG300J2YS45 may be used, and in the single power bridge embodiment an IGBT package manufactured by Powerex Part No. CM400DY-12H may be used.

The bus bar 82 is made up of an upper plate 84, a lower plate 86, and an insulation layer 88 sandwiched between the upper plate 84 and the lower plate 86. The upper and lower plates 84 and 86 may be any electrically conducting material, preferably metal such as copper. An input terminal 92 of the lower plate 86 is connected to the positive side of battery 40, while an input terminal 90 of upper plate 84 is connected to the negative side of battery 40. Thus, input terminals 90 and 92 receive high voltage direct current from the battery 40, preferably 340 volts.

Alternating current output cable 102 is connected to one of the stator windings 120 of the motor 28 shown in FIG. 2. For example, cable 102 of IGBT circuit 52a is connected to terminal A1.

The upper plate 84, lower plate 86, and insulation layer 88 are laminated together. The laminated bus bar 82 thus serves as the electrical connection for the three phase power bridges 48 and 50 shown schematically in FIGS. 3 and 4. Because of the "over-under" arrangement of the conductors in the bus bar 82, flux cancellation virtually eliminates the inductance of the bus bar. Since stray inductance can result in parasitic oscillations producing voltage spikes when current is switched on and off, the lamination technique reduces voltage spikes occurring on the voltage bus.

Package 94 is a fiberglass box which contains capacitor 72. Capacitor 72 is connected between the collector of IGBT 68a and the emitter of IGBT 68b. The capacitor 72 is encased in an electrically insulative potting compound, such as plastic formed in a fiberglass box, to form package 94. Holes 110 and 112 are formed in package 94 by, for example, drilling or molding. The electrical terminals of capacitor 72 are exposed to the holes 110 and 112.

Two serially connected IGBTs 68 and associated diodes 70 are encased in electrically insulating potting compound, such as a plastic, to form IGBT package 96. A conductive base plate 118 is attached to one side of IGBT package 96, and electrical terminals 122, 124, and 126 are attached to the opposite side of IGBT package 96. An electrically thermally conductive gasket 132 is inserted between the IGBT package 96 and a cooling plate 104 shown in FIG. 7.

Using IGBT circuit 52a as an example, electrical terminal 122 is connected to the emitter of IGBT 68b, electrical terminal 124 is connected to the collector of IGBT 68a, and electrical terminal 126 is connected to the emitter of IGBT 68a and the collector of IGBT 68b. Holes 114 and 116 are formed in electrical terminals 122 and 124 respectively. The holes 114 and 116 may be formed, for example, by drilling or molding. The gate drive circuit 56a connects to terminals 128 and 130.

The capacitor package 94, bus bar 82, and IGBT package 96 are connected together with electrically conductive connectors 98 and 100. Connectors such as rods, clips, bolts, rivets, or screws may be used, although screws are preferred. If screws are used as shown in FIG. 6, the holes 114 and 116 are threaded.

The connectors 98 and 100 both physically and electrically connect the capacitor package 94, bus bar 82, and IGBT package 96 together. The connections 98 and 100 thus provide both an electrical and a mechanical interface to the power bridge. Connector 98 connects one side of capacitor 72, the upper plate 84, and the emitter of IGBT 68b together both electrically and mechanically. Connector 98 fits through holes 110, 106, and 116. Connector 100 connects the other side of capacitor 72, lower plate 86, and the collector of IGBT 68a together both electrically and mechanically.

The sandwich structure shown in FIG. 6 eliminates unnecessary electrical and mechanical connections between IGBT package 96, capacitor package 94, and bus bar 82. Additionally, the sandwich structure eliminates parasitic stray inductance which could otherwise result in generation of parasitic oscillations. By sandwiching the bus bar 82 between the capacitor package 94 and the IGBT package 96, additional connecting hardware is also eliminated. Thus, a solderless connection that is easily assembled and repaired is achieved. The low inductance connection scheme shown in FIG. 6 also eliminates the need for additional dissipative active snubber capacitors used in traditional power bridge implementation.

As shown in FIG. 6, each U-shaped bus bar 82 can connect up to six IGBT and capacitor packages 96 and 94. Thus, both power bridges 48 and 50 can be assembled on a single bus bar 82 to form a dual power bridge. While only three switches are necessary to provide three-phase alternating current, each IGBT circuit 52 or 54 may not be able to handle the total high direct current voltage on terminals 90 and 92. Therefore, six IGBT circuits 52 and 54 divided into two power bridges 48 and 50 are connected to each bus bar 82.

Figure 7:
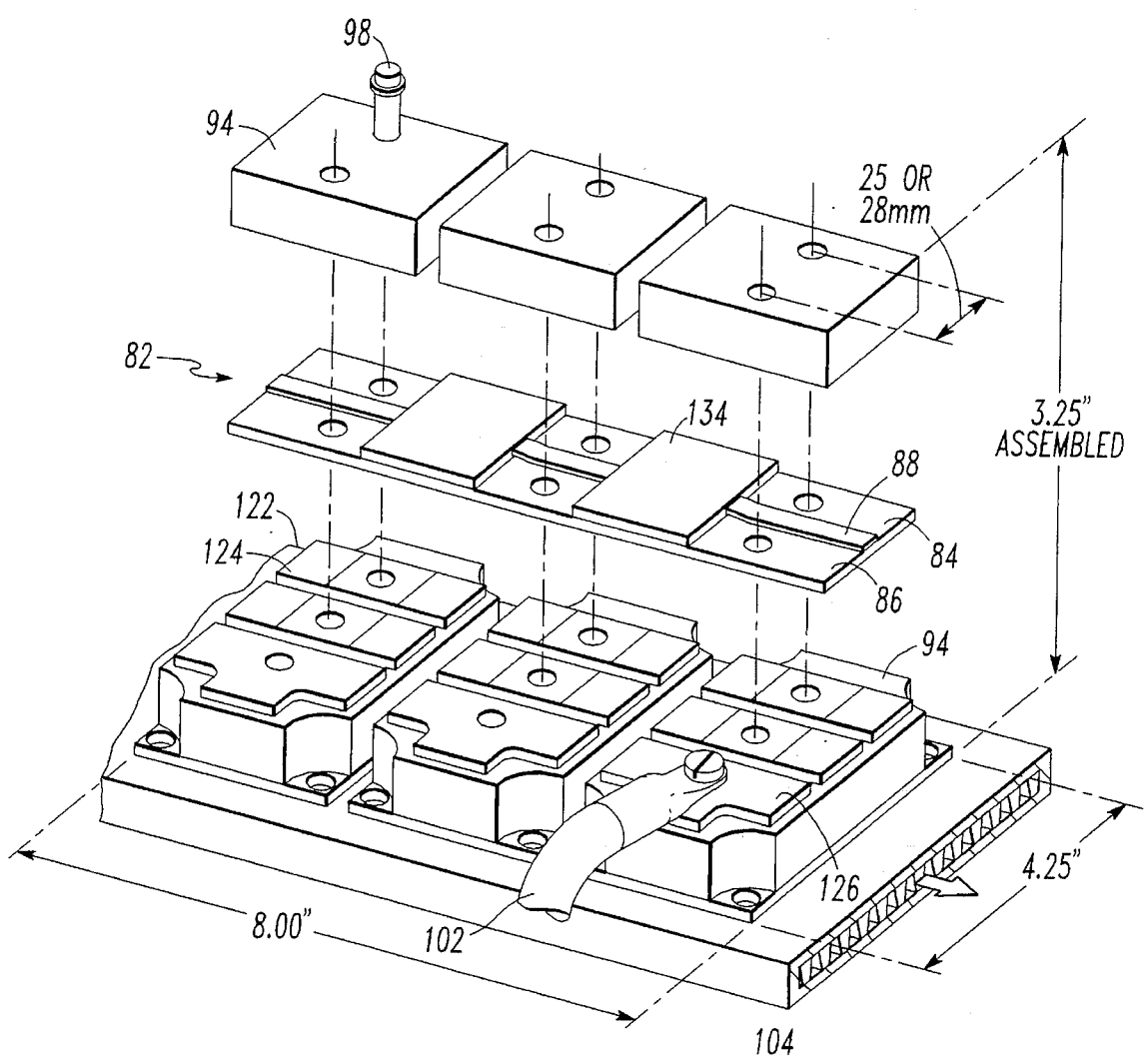
FIG. 7 is an exploded view of a single power bridge assembly for an electric vehicle propulsion system assembled in an electric vehicle, which constitutes a second embodiment of the invention.

FIG. 7 is a cut-away exploded view of a single power bridge assembly which constitutes a second embodiment of the invention. The reference numbers in FIG. 7 refer to similar structures as the identical reference numbers in FIG. 6. The single power bridge shown in FIG. 7 is mounted on a cooling plate 104. Cooling oil runs through the cooling plate 104 to dissipate heat generated by the IGBT's 68 and the other electrical components comprising the power bridges 48 and 50.

Bus bar 82 shown in FIG. 7 has an upper plate 84, a lower plate 86, and an insulation layer 88 sandwiched between the upper plate 84 and the lower plate 86. A capacitor package 94 and an IGBT package 96 sandwich the bus bar 82. Insulation pads 134 support the capacitor package 94.

It should be apparent to those skilled in the art that various modifications and variations can be made to the present invention without departing from the spirit or scope of the invention. Thus, it is intended that the present invention cover the modifications and variations of this invention provided they come within the scope of the appended claims and their equivalents.

We claim:

1. A switching assembly for an electric vehicle propulsion system, comprising:

a capacitor having a first terminal and a second terminal;

an electronic switch having a first terminal and a second terminal;

a laminated bus bar having first and second overlapping sections; and means for electrically and mechanically connecting the first terminal of the capacitor, the first terminal of the switch, and the first section of the bus bar to one another; and for connecting the second terminal of the capacitor, the second terminal of the switch, and the second section of the bus bar to one another, said electronic switch comprising at least one insulated gate bipolar transistor.

2. A switching assembly for an electric vehicle propulsion system, comprising:

a capacitor having a first terminal and a second terminal;

an electronic switch having a first input terminal and a second input terminal;

a bus bar having a first electrically conducting section and a second electrically conducting section, the bus bar being sandwiched between the capacitor and the switch;

first electrically conducting connecting means for connecting the first terminal of the capacitor, the first terminal of the switch, and the first section of the bus bar to one another; and second electrically conducting connecting means for connecting the second terminal of the capacitor, the second terminal of the switch, and the second section of the bus bar to one another, said electronic switch comprising at least one insulated gate bipolar transistor.

3. A switching assembly for an electric vehicle propulsion system as claimed in claim 2, wherein the bus bar is U-shaped and wherein the switching assembly comprises a dual power bridge.

4. A switching assembly for an electric vehicle propulsion system as claimed in claim 2, wherein the bus bar is linear and wherein the switching assembly comprises a single power bridge.

5. A switching assembly for an electric vehicle propulsion system as claimed in claim 2, wherein the switch comprises first and second insulated gate bipolar transistors each having a collector and an emitter, the emitter of the first transistor being connected to the collector of the second transistor, the first input terminal being connected to the collector of the first transistor, the second input terminal being connected to the emitter of the second transistor, and the switch further comprising an output terminal connected to the emitter of the first transistor and the collector of the second transistor.

6. A switching assembly for an electric vehicle propulsion system as claimed in claim 2 further comprising:

second and third capacitors; and second and third switches;

wherein the bus bar is sandwiched between the second capacitor and the second switch and wherein the bus bar is sandwiched between the third capacitor and the third switch.

7. A switching assembly for an electric vehicle propulsion system as claimed in claim 2, wherein the first section of the bus bar comprises an upper plate, the second section of the bus bar comprises a lower plate, and the bus bar further comprises an insulator sandwiched between the upper and lower plates.

8. A switching assembly for an electric vehicle propulsion system as claimed in claim 2, wherein the first and second connecting means comprise screws.

9. A switching assembly for an electric vehicle propulsion system as claimed in claim 2, wherein the switch is encased in potting compound.

10. A switching assembly for an electric vehicle propulsion system as claimed in claim 2, wherein the capacitor is encased in potting compound.

11. A switching assembly for an electric vehicle propulsion system for converting input direct current to output alternating current for driving an electric vehicle propulsion system, comprising:

a capacitor having a first terminal and a second terminal;

an electronic switch comprising: first and second insulated gate bipolar transistors each having a gate, a collector, and an emitter, the emitter of the first transistor being connected to the collector of the second transistor; a first input terminal connected to the collector of the first transistor; a second input terminal connected to the emitter of the second transistor; and an output terminal connected to the emitter of the first transistor and the collector of the second transistor;

a bus bar having an upper plate, a lower plate, and an insulator sandwiched between the upper and lower plates, the bus bar being sandwiched between the capacitor and the switch;

first electrically conducting connecting means for electrically and mechanically connecting the first terminal of the capacitor, the first input terminal of the switch, and the upper plate of the bus bar to one another; and second electrically conducting connecting means for electrically and mechanically connecting the second terminal of the capacitor, the second input terminal of the switch, and the lower plate of the bus bar to one another.

12. A switching assembly for an electric vehicle propulsion system as claimed in claim 11 further comprising:

second and third capacitors; and second and third switches;

wherein the bus bar is sandwiched between the second capacitor and the second switch and wherein the bus bar is sandwiched between the third capacitor and the third switch.

13. A switching assembly for an electric vehicle propulsion system as claimed in claim 11, wherein the first and second connecting means are screws.

14. A switching assembly for an electric vehicle propulsion system as claimed in claim 11, wherein the switch is encased in plastic.

15. A switching assembly for an electric vehicle propulsion system as claimed in claim 11, wherein the capacitor is encased in plastic.

16. A switching assembly for an electric vehicle propulsion system as claimed in claim 11, wherein the bus bar is U-shaped and wherein the switching assembly is a dual power bridge.

17. A switching assembly for an electric vehicle propulsion system as claimed in claim 11, wherein the bus bar is linear and wherein the switching assembly comprises a single power bridge.

* * * * *